Oct. 14, 1969   T. O. HOLMAN   3,472,328
WEIGHING DEVICE
Filed June 12, 1967

THOMAS O. HOLMAN
INVENTOR

BY *John C. Stahl*

ATTORNEY

United States Patent Office 3,472,328
Patented Oct. 14, 1969

3,472,328
WEIGHING DEVICE
Thomas O. Holman, San Antonio, Tex., assignor to View-Meter, Inc., San Antonio, Tex., a corporation of Texas
Filed June 12, 1967, Ser. No. 645,358
Int. Cl. G01g 5/04
U.S. Cl. 177—208                                    5 Claims

ABSTRACT OF THE DISCLOSURE

A weighing device including a pressure pad connecting by means of a hose to a calibrated standpipe. A noncompressible liquid in the said pressure pad and hose extends into the standpipe whereby the liquid level in the said standpipe indicates the weight of an object placed upon the pressure pad.

---

The present invention relates to a weighing device and more particularly to a portable weighing device utilizing a noncompressible liquid.

The primary object of the present invention is the provision of a weighing device which is useful in weighing fluids which under normal atmospheric conditions are primarily in a gaseous state.

Another object is to provide such a weighing device including means whereby objects of varying weight can be measured using a standpipe of minimal height.

A further object is the provision of a load measuring device including means to indicate a predetermined range of weights relative to an optimum weight.

Still another object is to provide such a weighing device which is simple to construct, includes no moving parts, is operative over an extremely wide range of temperatures, is inexpensive to manufacture, and is universal in its adaptability.

Other objects and features of the invention will become apparent to those skilled in the art as the disclosure is made in the following detailed description of preferred embodiments of the invention as illustrated in the accompanying sheet of drawing in which.

Figure 1:
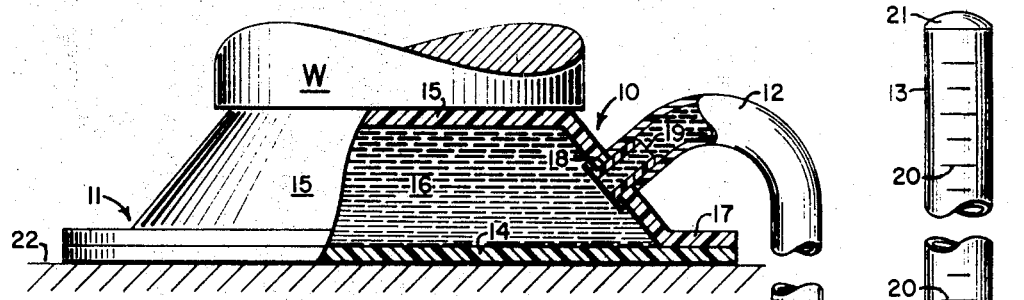
FIG. 1 is a diagrammatic view, partly broken away and partly in section, of a preferred embodiment of the subject invention.

Referring now to the drawings, wherein like reference characters designate like or corresponding parts throughout the several views, there is shown in FIG. 1 a preferred embodiment of the weighing device 10 of the subject invention consisting, in general, of pressure pad 11 connecting as by means of flexible hose 12 of desired length to vertically extending standpipe 13. More particularly, pressure pad 11 consists of base 14 of desired shape to which flexible diaphragm 15 is secured in a liquid-tight seal with chamber 16 formed therebetween. Preferably, base 14 is circular in plan and diaphragm 15 is of truncated conical vertical section terminating laterally in flange 17 which is secured circumferentially to said base. Hose 12, base 14 and diaphragm 15 are desirably of similar composition and may be of plastic, nylon reinforced plastic, rubber or any similar material which remains flexible for extended periods of time at temperatures ranging from −30° to 125° Fahrenheit. Polyvinyl chloride ranging from 1/16 to 1/8 inch in thickness has proven especially desirable for both base and diaphragm.

Bore 18 is suitably provided in diaphragm 15 and male fitting 19 is secured therein in a liquid-tight seal. One end of tube 12 heretofore mentioned is conventionally secured to fitting 19 while the opposite end of the said hose connects to the lower end of standpipe 13.

In the embodiment of FIG. 1, standpipe 13 may range from six to approximately fourteen inches in height with an inside diameter ranging from 1/8 to 1/2 inch; said standpipe is of a transparent material such as acrylic plastic, glass or the like and is provided with marks 20 or other indicia in a manner hereinafter to be described. Plug 21 of plastic or the like tightly inserts into the bore at the upper end of said standpipe.

A noncompressible liquid such as ethylene glycol, kerosene or other noncompressible liquid which remains fluid at a temperature of −30° Fahrenheit fills cavity 16 and hose 12 and extends upwardly into the lower portion of standpipe 13. Plug 21 is inserted into the upper end of standpipe 13 with an air chamber or buffer between the base of said plug and the meniscus of the liquid in the said standpipe.

To calibrate the weighing device 10 thus formed, pressure pad 11 is positioned upon a supporting structure 22 with standpipe 13 remote thereto and conventionally secured at an elevated height. At such time a mark or other indicia is provided on standpipe 13 to indicate the liquid level when no weight is placed upon pressure pad 11. Thereafter a first known weight W is placed upon diaphragm 15 and a mark scribed or otherwise provided on the standpipe in alignment with the meniscus of the liquid therein. The entire standpipe is calibrated in like manner to indicate other known weights in either the English or metric systems. Any unknown weight within the calibrated limits may then be determined by observing the liquid level in the standpipe relative to the predetermined markings on the standpipe or such weight may be estimated by interpolating between adjacent known markings.

In a modification of the invention, a pressure pad which is biconvex in elevation consists of an upper convexo-concave and a lower concavo-convex section which are secured circumferentially in a liquid-tight seal. Connecting means similar to male fitting 19 may be provided on at least one section to accommodate one end of hose 12 heretofore mentioned.

Figures 2, 3:
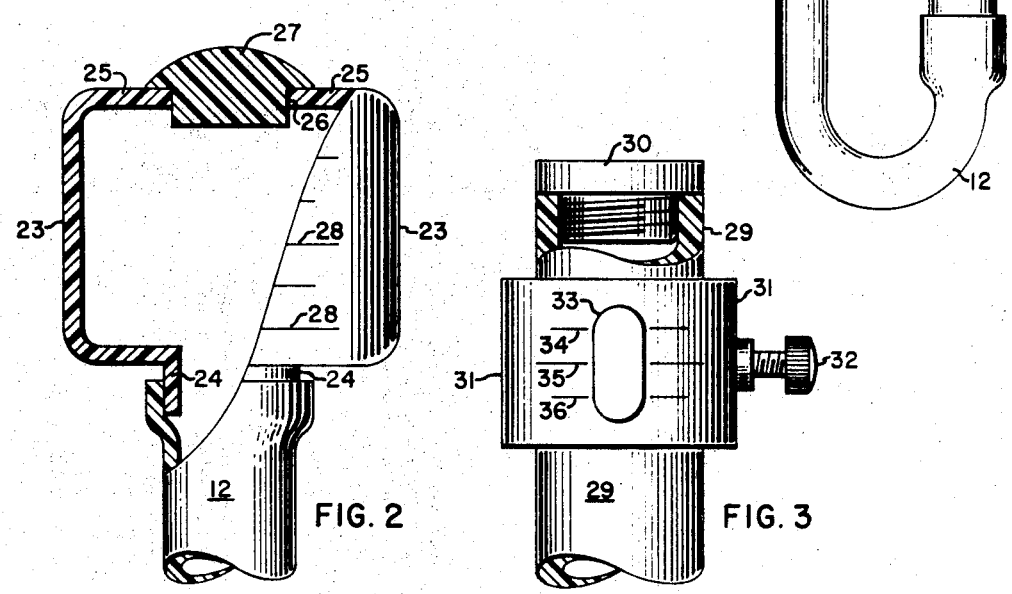
FIG. 2 is a greatly enlarged side elevational view, partly broken away and partly in section, of the upper portion of a modified standpipe used in the practice of the subject invention.
FIG. 3 is a greatly enlarged side elevational view, partly broken away and partly in section, of the upper portion of another standpipe used in the practice of the subject invention.

There is shown in FIG. 2 of the drawings a modified standpipe 23 which is to be used with pressure pad 11 and hose 12 of FIG. 1 of the drawings. Standpipe 23 is generally cylindrical and terminates downwardly in neck 24 of reduced diameter to which one end of hose 12 connects. Upwardly the said standpipe is flanged inwardly, indicated by reference numeral 25, and includes a central bore 26 which accommodates stopper 27 or the like. Vertically spaced markings 28 are conventionally provided on standpipe 23 in the manner heretofore described. The inside diameter of standpipe 23 is substantially greater than the inside diameter of neck 24 or hose 12 secured thereto. By providing a greater volume in such standpipe to accommodate the liquid displaced by the weight which is being measured, a greater range of weights can be measured without substantially increasing the height of the standpipe.

The invention further contemplates upper and lower standpipes which are vertically aligned and of different inside diameters wherein said standpipes may either be integrally formed or secured together in a conventional manner. Preferably the lower standpipe is of relatively small inside diameter and marks or other indicia provided thereon in the manner heretofore described to reflect small increments of weight; the upper standpipe is of substantially greater inside diameter and is calibrated to indicate large increments of weight. The standpipe thus formed is especially useful in measuring any weight, either large or small, wherein the standpipe is of minimal height.

Referring now to FIG. 3 of the drawings, there is shown a further modified standpipe 29 which is internally threaded at its upper end to receive screw 30 or the like. Additionally, sleeve 31 slidably fits on said standpipe 29 or on standpipe 13 of FIG. 1 and a secured at a desired position thereon by means of set screw 32 the innermost end of which is adjusted to bear against the side of the respective standpipe. A vertically extending window 33 is provided in sleeve 31 to enable the user to view the liquid level within the standpipe; a plurality of vertically spaced marks 34–36 terminate in proximity to such window. Sleeve 31 is adjusted on the standpipe whereby mark 35 indicates a desired or optimum weight; marks 34, 36 indicate weights above and below the optimum. Such construction is especially useful in those applications wherein a predetermined weight is desired but the said weight must fall within minimum or maximum limits.

It is to be further understood that a float (not shown) composed of plastic, glass or the like may be provided in the bores of the standpipes of FIGS. 1 and 3 of the drawings to indicate the liquid level in the respective standpipes.

Figure 4:
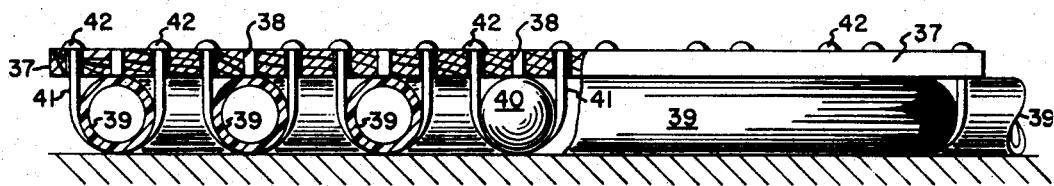
FIG. 4 is a side elevational view, partly broken away and partly in section, of a modification of the invention.

In FIG. 4 there is illustrated another embodiment of the invention consisting of plate 37 of desired shape and composed of perforated hardboard or the like including a plurality of vertically extending bores 38 which are both longitudinally and transversely aligned. More specifically, hose 39 of approximately one-half inch inside diameter is spirally wound and secured to the undersurface of plate 37. One end of hose 39 is provided with stopper 40 for bleeding air from the device; the opposite end of hose 39 connects to any of the standpipes heretofore illustrated and described. A flexible strap 41 of plastic, rubber or the like terminates at each end in expanded portion 42; the medial portion of strap 41 is partially passed around hose 39 with the expanded portions 42 inserted through selected bores laterally of the said hose. Portions 42 bear against the upper surface of plate 37 thereby securing hose 39 in position. The weighing device thus formed in then filled with liquid, calibrated and thereafter any unknown load may be placed upon plate 37 for weighing the same.

Figure 5:
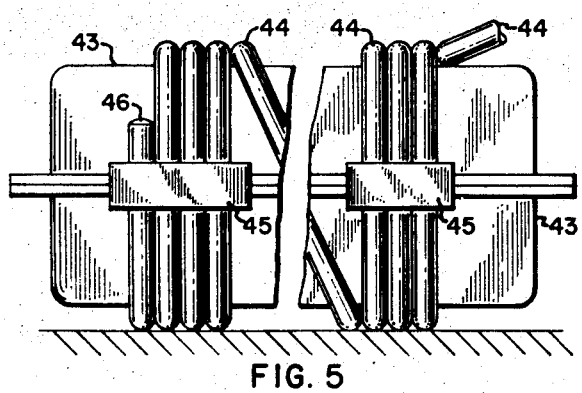
FIG. 5 is a side elevational view, partly broken away, of another modification of the invention.

There is illustrated in FIG. 5 of the drawings a still further modification of the invention wherein tank 43 of desired shape and volume includes weighing means constructed in accordance with the principles of the subject invention. More particularly, hose 44 is circumferentially wound around tank 43 in proximity to each end whereby the tank is supported upon the said hose; straps 45 or other conventional means secure hose 44 to the said tank. Plug 46 inserts into one end of hose 44 while the free end thereof connects to any of the standpipes heretofore illustrated and described. Hose 44 is filled with a noncompressible liquid and the standpipe calibrated. Obviously, in those applications where the contents of tank 43 gradually diminishes, the liquid level in the standpipe attached to hose 44 reflects the weight of the contents remaining in the said tank.

What is claimed is:
1. A weighing device consisting of
   a plate having a top and bottom,
   a plurality of vertically extending bores passing through said plate,
   an elongated, flexible hose having first and second ends,
   means passing through selected bores in said plate and partially around said hose securing said hose to said plate,
   closure means in said first end of said hose,
   a standpipe secured to said second end of said hose, and
   a noncompressible liquid in said hose and extending into said standpipe.
2. The invention of claim 1 wherein said standpipe includes a plurality of markings to indicate a plurality of known weights placed upon said plate.
3. The invention of claim 1 wherein said standpipe consists of first and second vertically aligned and communicating sections, said first section of one inside diameter and said second section of substantially greater inside diameter.
4. The invention of claim 1 including a sleeve positioned on said standpipe, said sleeve including an opening.
5. The invention of claim 1 including a float in said standpipe to indicate the liquid level therein.

References Cited

UNITED STATES PATENTS

| | | | |
|---|---|---|---|
| 1,458,920 | 6/1923 | Troll | 177—208 |
| 2,577,100 | 12/1951 | Alvarez | 177—208 |
| 2,667,184 | 1/1954 | Hailer | 177—208 |

FOREIGN PATENTS

| | | |
|---|---|---|
| 794,941 | 5/1958 | Great Britain. |

ROBERT S. WARD, Jr., Primary Examiner